United States Patent [19]
Conrads et al.

[11] Patent Number: 4,635,072
[45] Date of Patent: Jan. 6, 1987

[54] PRINTING APPARATUS AND METHODS FOR COMPENSATING SYNCHRONIZATION ERRORS

[75] Inventors: Norbert Conrads, Herzogenrath; Ulrich Schiebel, Aachen; Rolf Kirchhoff, Freusburg, all of Fed. Rep. of Germany

[73] Assignee: U.S. Philips Corporation, New York, N.Y.

[21] Appl. No.: 771,473

[22] Filed: Aug. 30, 1985

Related U.S. Application Data

[63] Continuation of Ser. No. 494,217, May 13, 1983, abandoned.

[30] Foreign Application Priority Data

May 14, 1982 [DE] Fed. Rep. of Germany ....... 3218120

[51] Int. Cl.⁴ .......................... G01D 15/06; G01D 9/12
[52] U.S. Cl. ...................................... 346/1.1; 346/160; 346/161; 346/110 R
[58] Field of Search .................... 346/110 R, 161, 158, 346/108, 153.1, 154, 159, 160; 355/3 R; 358/300; 346/1.1

[56] References Cited

U.S. PATENT DOCUMENTS

| | | | |
|---|---|---|---|
| 3,155,022 | 11/1964 | Schwertz | 346/160 X |
| 4,134,668 | 1/1979 | Coburn | 346/160 X |
| 4,134,668 | 1/1979 | Coburn | 346/160 X |
| 4,367,943 | 1/1983 | Nakamura | 101/DIG. 13 X |
| 4,412,230 | 10/1983 | Goldberg | 346/110 R |
| 4,459,512 | 7/1984 | Ohhata | 346/110 R X |

*Primary Examiner*—Joseph W. Hartary
*Assistant Examiner*—Linda M. Peco
*Attorney, Agent, or Firm*—David R. Treacy

[57] ABSTRACT

The invention provides a method for compensating synchronization errors in non-impact printers, without influencing the transport of the record carrier and without changing the printing frequency of the printing elements. A control value is derived from a difference between the actual transport speed and a predetermined transport speed of the record carrier. This control value is used to vertically deflect the recording beam, after each picture line, by a fraction of the predetermined picture line spacing. The sum of the cumulative vertical deflections are compared with the value of the picture line spacing, and the recording of the next picture line is delayed by one deflection period of the recording beam when the sum is greater than or equal to the value of the picture line spacing.

4 Claims, 6 Drawing Figures

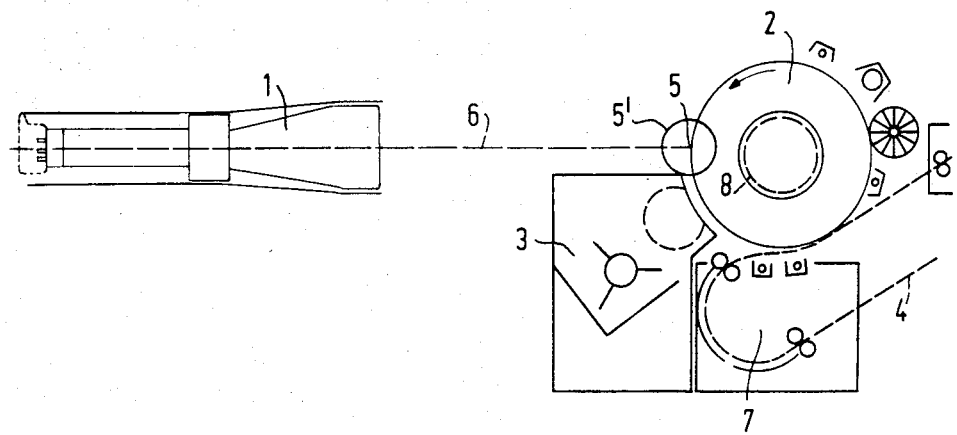
FIG.1
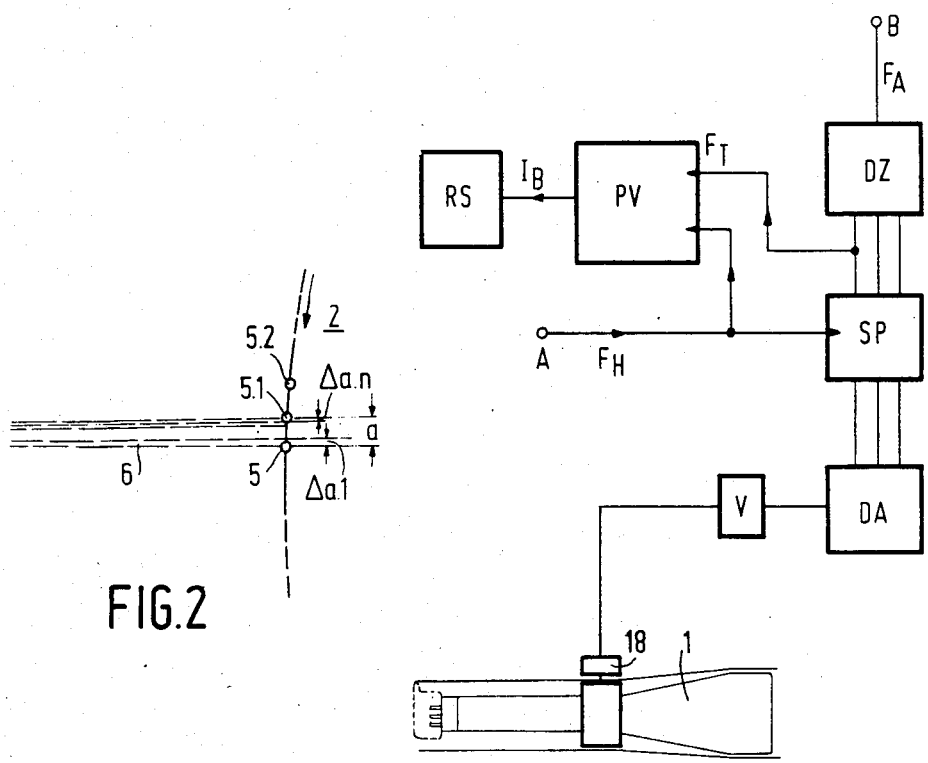
FIG.2
FIG.3

PRINTING APPARATUS AND METHODS FOR COMPENSATING SYNCHRONIZATION ERRORS

This is a continuation, of application Ser. No. 494,217, filed May 13, 1983 now abandoned.

BACKGROUND OF THE INVENTION

The invention relates to a method and apparatus for compensating synchronization errors in the transport of a record carrier in non-impact matrix printers, notably electrophotographic printers, in which the stored information of a line of print is formed by picture lines which are to be successively recorded with constant time intervals, the spacing of the picture lines being dependent on the transport speed of the record carrier and the recording frequency of the picture lines.

Non-impact printers do not involve direct contact between the printing members and the record carrier. Instead a line of print is recorded by spraying (for example, ink jet printers) or forming a latent image (electrostatic and electrophotographic printers) which is subsequently developed and fixed. Moreover, the characters of a line of print can be formed in various ways. For example, when a single character is composed from $5 \times 7$ dots, $5 \times 7$ individually activated recording elements can be provided. In that case, the character is composed in one operation. It is alternatively possible to arrange only five recording elements over one another and to make these elements perform seven steps in order to compose the single character. In both cases, a line of print is formed one character after the other. A third possibility consists in that there is provided only a single recording element or an array of adjacently arranged recording elements, so that for the formation of the characters of a line of print the relevant dots of a picture line are formed successively or simultaneously and five picture lines are successively recorded. This possibility is preferably used in line printers. This method is used notably in electrostatic and electrophotographic printer and ink jet printers. In electrostatic printers, preferably as many electrodes are adjacently arranged as dots can be contained in a picture line. The necessary picture lines are then successively recorded by transporting the record carrier. Instead of the multitude of electrodes, electrophotographic printers utilize only a single recording beam which is horizontally deflected from dot to dot within a picture line. It is thus also possible to record the same content of a picture line several times. A picture line then consists of several sub-lines.

The invention relates to such printers in which the lines of print are recorded one picture line after the other. The recording speed for a line of print depends on the transport speed of the record carrier and on the speed of actuation of the recording elements in electrostatic printers or on the deflection speed (line frequency) in electrophotographic printers. The quality of the printed picture itself depends mainly on the spacing of the dots. The more these dots overlap, the better the printed picture will be. The dots in the picture line can be made to overlap in electrostatic printers by arranging the electrodes in a configuration with several rows of electrodes which are staggered with respect to one another. In electro-optical printers, a picture line is formed by horizontal deflection of the recording beam. The total deflection corresponds to the feasible length of a line of print. The overlapping of the dots in the vertical direction is not problematic, because the spacing between the picture lines can be chosen at random and is dependent on the transport speed of the record carrier. A line of print can thus be readily composed of from 10 to 100 picture lines. The spacing between the picture lines is customarily from 0.05 to 0.2 mm. A picture is thus obtained which is substantially equivalent to a conventional printed picture.

A condition for such a quality of the printed picture, however, is that the fixed spacing between the picture lines must remain constant as much as possible over long periods of time. Even though the synchronization of the recording of the picture lines by the electronic control of the recording elements or the line frequency of the recording beam can be readily achieved, problems arise as regards the transport of the record carrier; these problems are caused mainly by the drive elements, for example, transmissions, motor, etc.

Synchronization errors in the transport speed of the record carrier can be tolerated during the recording of a single line of print if they do not exceed a few percents . For the printing of larger sheets, for example, DIN A4, with a multitude of lines of print, however, the synchronization errors must be substantially smaller, because errors in the spacing of the picture lines due to transport speed fluctuations can accumulate over the full length of the sheet. Therefore, the tolerance for such long-term errors should be from 0.2 to 0.5%. However, this can be achieved only with great difficulty in the record carrier drive, for example, by accurately controlled motors. The less expensive asynchronous motors have a transport speed tolerance of a few percents, taking into account line voltage fluctuations and different operating modes of the machine, e.g. intermittent or continuous printing.

SUMMARY OF THE INVENTION

It is an object of the invention to provide a method of synchronizing the transport of the record carrier and the recording of a line of print consisting of picture lines in line printers, without it being necessary to change the recording frequency of the recording elements or the transport, because a constant recording frequency of the picture lines is desired or required for many recording applications.

This object is achieved in that a control value is derived from a difference between an actual transport speed (actual value) of the record carrier and a predetermined transport speed (desired value), said control value causing a shift of the recording of a picture line in its predetermined recording zone on the record carrier without changing the recording frequency of the picture lines.

A predetermined transport speed is to be understood to mean herein the speed of the record carrier at which the control of the recording elements or the recording beam always results in the recording of each picture line in exactly the same recording zone.

Circuits for the comparison of the actual value and the desired value and a control value derived therefrom are assumed to be known, per se. It is also assumed that the construction of an electrostatic or electrophotographic printer is known, for example, form U.S. Pat. No. 3,624,661 and DE-OS No. 31 08 115 (published Sept. 16, 1982).

A particularly attractive embodiment of the invention consists in that the recording beam which is customarily only horizontally deflected for the recording of the picture line is also vertically deflected, after each picture line, by a fraction of the picture line spacing, the sum of these vertical deflections being compared with the value of the picture line spacing, and the recording of the next picture line being delayed by one deflection period of the recording beam when this sum reaches or exceeds this value of the picture line spacing.

The deflection frequency is chosen to be so that it is always larger than or equal to the picture line frequency given by the drum speed and the given picture line spacing. For example, when the predetermined but arbitrarily adjustable picture line spacing amounts of 0.08 mm, the vertical deflection per picture line may be from one to two powers of ten smaller.

Such a synchronization control method offers the advantage that the necessary circuit is simple, because the vertical deflection of the recording beam takes place in only one direction, that is to say in the direction opposing the transport direction of the record carrier.

A further preferred embodiment in accordance with the invention consists in that each picture line is recorded n times (n=1, 2, 3, ...) with the same informational content, the shifting of the recording of a picture line being performed only after a number of picture lines which is determined by the control value so that when the actual value deviates from the desired value in one direction (for example, slow transport), the picture line last recorded is recorded (n+1) times while when the actual value deviates from the desired value in the other direction (for example, fast transport), the picture line to be recorded next is recorded (n−1) times.

This method can be used particularly well in an electrophotographic printer as described in DE-OS No. 31 08 115, because therein a single picture line can be formed by several deflection cycles. For example, assuming that each picture line is deflected or recorded twice, with the same informational content there will be 100 deflection cycles (picture lines) of the recording beam for one line of print when the height of the line of print is 4.223 mm and the picture line spacing is 0.08467 mm. If, for example, a single correction step were to be performed in this line of print due to synchronization errors in the record carrier transport, the correction would only be 1%. This correction means that either 99 (in the case of fast transport) or 101 (in the case of slow transport) of the 100 feasible deflection cycles would be recorded.

A complete set of characters usually includes special characters which extend over the entire height of the line of print. When such characters consist mainly of continuous vertical structures, no problems will be experienced when picture lines are skipped. When cycles are added, they must have the same information content as the picture lines last recorded.

In case of so-called "logotypes" which cover several lines of print, it may occur that, depending on the shape of the character structure, the correction becomes visible so that the character does not have the desired structure. In that case, steps can be taken to ensure that the correction is omitted in the corresponding picture lines.

BRIEF DESCRIPTION OF THE DRAWINGS

Two embodiments in accordance with the invention will be described in detail when taken in conjunction with the accompanying drawing, in which:

FIG. 1 shows the construction principle of a photoelectric printer.

FIG. 2 shows a detail, at an increased scale, of the recording zone of the record carrier shown in FIG. 1.

FIG. 3 shows the circuit arrangement for an embodiment in accordance with the invention.

DESCRIPTION OF THE PREFERRED EMBODIMENTS

Figure 4:
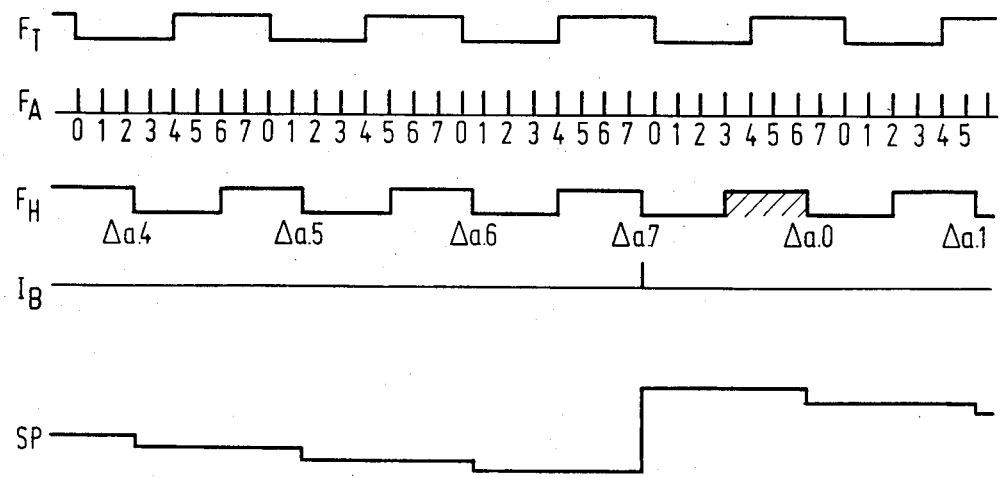
FIG. 4 shows the frequency diagram of the circuit arrangement shown in FIG. 3.

FIG. 1 shows the construction principle of an electrophotographic matrix printer. A cathode ray tube 1 projects a recording beam 6 onto a record carrier which records a dot in latent form at the area of incidence. The recording beam 6 is deflected perpendicularly to the plane of drawing by the cathode ray tube 1, i.e. horizontally along the longitudinal axis of a drum 2. Each deflection produces a dot in accordance with the information stored, so that a picture line 5 is recorded. Instead of the cathode ray tube 1, use can alternatively be made of a laser. Instead of using the cathode ray tube, it is also possible to arrange an electrode array in front of the record carrier 2 at the area of the picture line 5, said electrode array extending across the full width of the picture line for the electrostatic recording of the picture line.

The record carrier 2 of the present embodiment is constructed as a drum which rotates about its shaft in the direction of the arrow. A slotted disk 8 is connected to this shaft in known manner, said disk producing, in conjunction with a light source and a photodiode, a pulse series which corresponds to the actual transport speed of the drum 2. The latent picture produced by the recording beam 6 or the electrodes is developed in the development station 3 and is transferrd to a sheet or strip of paper 4 in the transfer station 7. After the subsequent erasure of the picture on the drum 2, the drum will be ready again for a new recording at this area.

FIG. 2 shows (at an increased scale) the part of the drum 2 which is denoted by a circle 5' in FIG. 1. When a recording beam 6 is incident on the drum 2, a dot is recorded at the area 5. Due to the deflection of the recording beam 6 perpendicularly to the plane of drawing, a picture line which extends across the full recording width is recorded at this area. Subsequently, the recording beam 6 is returned to its starting position and a new picture line can be recorded. The smaller the picture line spacing, the better the quality of the picture to be printed.

Assuming that no fluctuations whatsoever occur in the adjusted line frequency of the recording beam 6 as well as in the synchronization of the drum 2, each successive picture line 5.1, 5.2 and so on will be recorded at the area 5 of the drum. This may be possible in theory, but hard to achieve in practice, because more than likely fluctuations will occur at least in the synchronization of the drum 2 so that, considering the line frequency of the recording beam 6, the successive picture lines 5.1, 5.2 and so on will be recorded exactly at the area of the picture line 5 only by chance. More than likely, however, they will be recorded slightly before or slightly after that line. These synchronization errors of the drum 2 can accumulate across the full length of the paper, thus giving rise to errors in the position of the picture lines.

These synchronization errors and any speed fluctuations can be neutralized to a high degree by means of the circuit arrangement whose principle is shown in FIG. 3. This circuit modifies neither the normal line frequency itself nor the actual transport speed of the drum 2 or of the record carrier. In order to achieve this, after each recording of a picture line 5, the recording beam 6 is deflected, in addition to the horizontal deflection, in the vertical direction by a fraction of the picture line spacing. Compared to the picture line spacing a, the amount of the latter deflection $\Delta a$ is very small. The individual amounts $\Delta a.1$ through $\Delta a.n$ are summed in order to be compared with the predetermined picture line spacing a after each summing operation. When the value a is reached at any instant, the picture line to be recorded next is suppressed in order to be recorded after a delay equal to a picture line period. During this period, the record carrier travels the distance $a - \Delta a$, so that the picture line suppressed thus far is again recorded at the area 5. Thus, synchronization errors in the movement of the drum can exert an effect only within the picture line spacing a.

Because the picture line spacing a is very small, the synchronization errors occuring are no longer noticed. When a customary resolution of 300 picture lines per inch is chosen, the picture line spacing a will be 0.08467 mm.

The slotted disk and the light barrier produce pulses F whose frequency amounts to a multiple of the frequency of the picture lines or of the trigger pulses $F_H$ of the horizontal deflection of the recording beam. For a selected number of pulses $n=8$, $8 \times \Delta a$ is obtained for the picture line spacing a. This pulse series $F_A$ is applied, via the input B, to a dual counter DZ with a binary code 1, 2, 4. In this dual counter DZ, the signal $F_T$ is produced. Furthermore, the outputs of the dual counter DZ are connected to a memory SP which is controlled by the negative edge of the trigger pulses $F_H$. The content of this memory SP thus achieves the vertical deflection of the recording beam 6 by the amount $\Delta a$ via the digital-to-analog converter DA and the vertical amplifier V. To this end, the vertical amplifier V is connected to the deflection coil 18 of the cathode ray tube 1.

The signal $F_T$ of the dual counter DZ as well as the trigger pulse $F_H$ are applied to a phase comparator PV which switches only in reaction to the negative edges of both pulses $F_T$ and $F_H$. As shown in the diagram of FIG. 4, the pulse width of the trigger pulses $F_H$ is slightly smaller than that of the signals $F_T$, so that the trigger pulses $F_H$ once lead and once lag the signals $F_T$. Whenever the negative edges of the trigger pulses $F_H$ and the signals $F_T$ intersect, i.e. when lagging changes over to leading, a pulse $I_B$ is applied to the picture line memory RS. In the present embodiment, this takes place after the vertical deflection $\Delta a.7$. Due to this pulse, the recording beam 6 is blanked during the next picture, so that horizontal deflection but no recording takes place. This blanking is denoted by shading in the diagram of the trigger pulses $F_H$. The content of this suppressed picture line is recorded only during the next picture line.

The lower diagram of FIG. 4 shows the voltage on the output of the digital-to-analog converter DA. Because the diagrams of FIG. 4 are shown at an increased scale, only the area around the deflection of a picture line shown. Furthermore, synchronization errors of the drum 2 become manifest in the pulse series $F_T$ and $F_H$ as different pulse widths.

Figure 5:
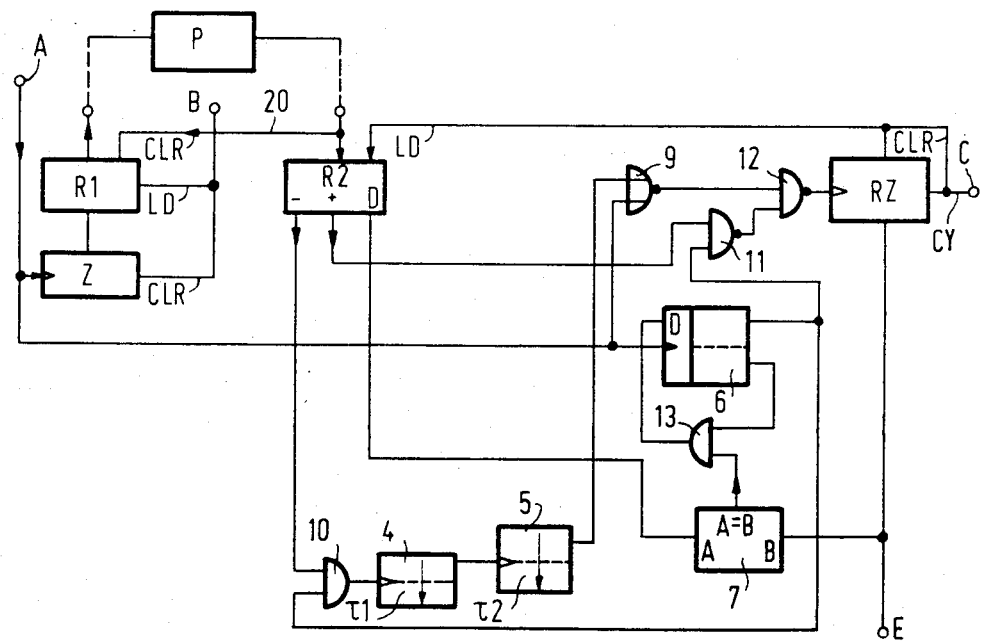
FIG. 5 shows a circuit arrangement for a further embodiment in accordance with the invention.

FIG. 5 shows the principle of a further circuit arrangement for neutralizing synchronization errors of the drum 2. It is assumed that short-term fluctuations per se are not noticed, that is to say synchronization errors which compensate one another within a short period of time. Short-term is to be understood to mean herein the period of time during which the drum 2 is transported through a few lines of print.

For the determination of the actual transport speed of a record carrier, for example, the drum 2, a pulse series is formed in known manner (not shown), for example, by means of a slotted disk which is mounted on the drive shaft 8 and which is sensed by a light barrier. The distance in time between the individual pulses of this pulse series is a measure for the actual transport speed of the drum 2. The mean distance between two successive pulses is chosen so that it corresponds to a transport path of from 30 to 100 mm. It is thus achieved that short-term fluctuations in the drum transport cannot falsify the measurement of the mean transport speed.

The pulse series derived from the transport speed of the drum 2 is applied, via the terminal B, to a register R1 and a counter Z. Each pulse of this series resets the counter to its starting position while preparing the register R1 for storage. The trigger pulses A for the recording of the picture lines by the recording beam are also applied to the counter Z. These trigger pulses A are such that each picture line is preferably actuated twice in the selected example. Each picture line is thus recorded twice. The counter Z counts the trigger pulses A which are applied to the counter Z during the actual time interval between two pulses of the pulse series derived from the slotted disk, i.e. the distance in time of the pulse series is measured by the counting of the picture lines recorded during this period. The result is applied, via the register R1, to a processor P of the matrix printer for further processing.

The transfer of the content of the register depends on several parameters. For example, a transfer or a correction should not be performed during a picture line. Moreover, for special characters such as symbols or logotypes, a correction should not be performed within one or possibly more lines of print.

Figure 6:
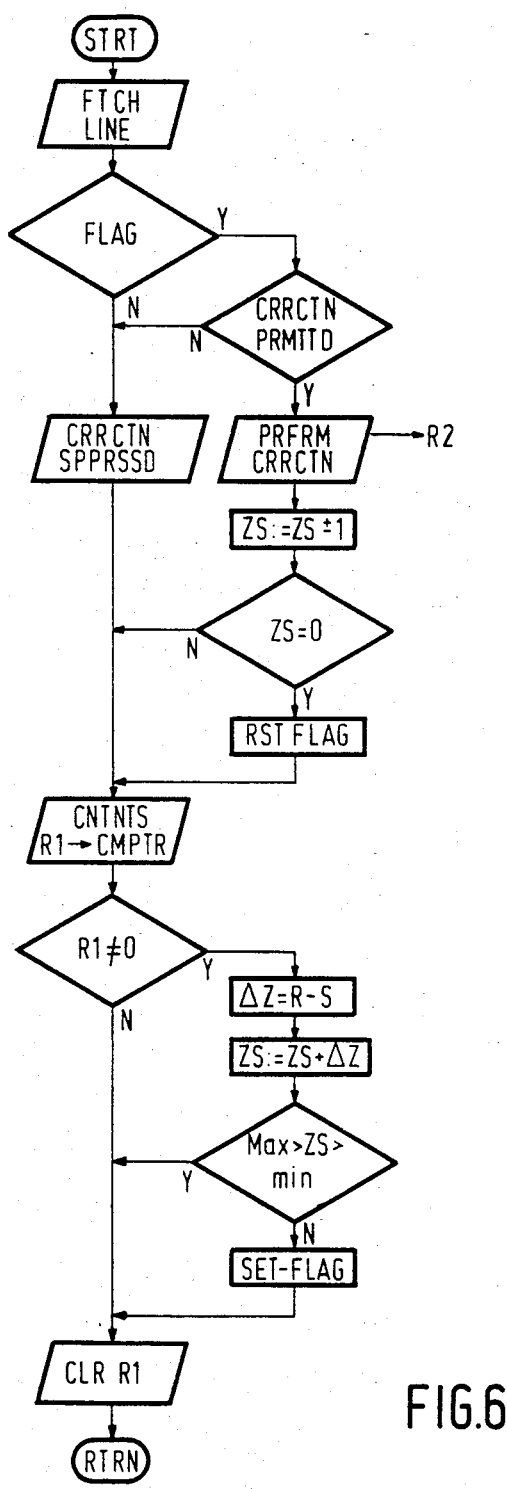
FIG. 6 shows the flowchart of the control of the circuit arrangement shown in FIG. 4.

For an illustration of these steps, reference is now made to the flowchart of FIG. 6 which shows a program for the transfer of a line of print and the correction of synchronization errors. After the start pulse, supplied by the output C of the circuit shown in FIG. 5 after the recording of a line of print, the information content of the picture lines of a line of print is recorded in known manner (not shown). Subsequently, the logic state of a flag is determined. Therefrom it is determined whether or not a correction is to be performed in the line of print. When the flag is set, i.e. a correction is to be made, it must also be tested whether or not a correction is permissible in the line of print. This decision can be made prior to the printing operation in another subroutine which is not shown here. It depends on the possibility of manipulation of a picture line for all characters occuring in the relevant line of print. The picture line correction address D of a line of print is thus calculated already before the printing operation and is stored in a given memory section. For example, during the recording of curves or other graphic symbols, no corrections may be made in the lines of print in which these characters or parts of these characters are to be recorded.

When a correction is permissible in a line of print, the correction signals determined (picture line correction address D and negative (−) or positive (+) signal) are applied to the circuit shown in FIG. 5. However, if the flag is not set or if no correction may be performed in the line to be printed, the correction signals are inhibited.

The logic state of the positive or negative signal (slow or fast transport of the drum, respectively), is determined by the sign of the buffer memory ZS. The buffer memory ZS contains the number of lines of print yet to be corrected within two successive pulses, that is to say two pulses of the pulse series derived from the transport speed of the drum, which are applied to the terminal B of the circuit of FIG. 5. The sign of this value determines whether a picture line is to be added to the line of print (ZS≦0) or whether a picture line is to be skipped (ZS≧0). However, if ZS=0, all necessary corrections have been performed or no correction is necessary. The flag is then reset.

After this intermediate decision, the content of the register R1 is written into the computer and tested during each program pass performed at the beginning of the recording of each line of print. When the content of this register is not equal to 0, a measuring cycle has been terminated in the counter Z. In that case, the difference between the measured value R (actual value) and a predetermined counter value S (desired value) is determined in the processor P and the result ΔZ is added to the value which is already present in the buffer memory ZS and which consists of previous measurement results. The corrections not yet performed until this instant are thus also taken into account. During the next logic decision it is determined whether or not the value contained in the buffer memory ZS is within predetermined tolerances. When the value exceeds the permissible limit values between which no correction is required or desirable, the flag receives a set signal. During the next program pass, that is to say during the recording of the next line of print, the decisions represented in the first part of the flowchart are then carried out. However, these decisions are skipped if the value contained in the buffer memory ZS is within the predetermined tolerance limits. Simultaneously with determination of this program, the register R1 is erased via the line 20. It contains the value 0 until the transfer of the next measurement result by to the next pulse of the pulse series B.

When the flag was set after completion of the described program, one of the outputs (−), (+) will carry a signal. The relevant output is activated when the next line of print is marked by the output C. During the printing of a line of print, the picture line counter RZ successively generates the relevant picture line addresses E of the character memory (not shown). This address is compared with the correction address D of the register R2 by the digital comparator 7. As long as the inputs A and B are unequal, correction of the line of print is not possible. The trigger pulses A can readily reach the picture line counter RZ via the inverting gate 9 and the NAND-gate 12. When the picture line to be corrected is reached during printing, that is to say when the logic states on the inputs A and B are the same, the output A=B of the comparator 7 will carry a signal. This signal is applied, via the gate 13, to the D input of the flip-flop 6 and is taken over in this flipflop 6 in reaction to the negative edge of the picture line trigger signal A. Correction of the line of print is then possible via the gates 10 or 11.

If the output (+) of the register R2 carried a signal during the last measuring cycle of the counter Z, that is to say if the transport speed of the drum 2 was too slow, the recorded picture line is repeated by the inhibition of the transfer of the next picture line trigger signal A to the picture line counter RZ via the gate 11. The gate 11 is blocked because both inputs carry a signal and the output is inverted. Therefore, the NAND-gate 12 is also blocked, so that this trigger pulse A produces a pulse on only one input via the gate 9. Consequently, switching further is prevented in the picture line counter RZ and the same information of the picture line is recorded once more. The next trigger signal A resets, by way of the negative edge, the D-input of the flipflop 6, and the next picture lines are output as usual.

However, if the output (−) of the register R2 carried a signal during the last measuring cycle, i.e. if the transport speed of the drum 2 was too high, an additional picture line trigger signal τ2 is produced by the monostable multivibrators 4 and 5, the pulse τ1 produced by the monostable multivibrator 4 then introducing a delay. This additional trigger signal τ2 also advances the picture line counter RZ again in reaction to the leading pulse edge of the trigger signal A, via the gates 9 and 12. The next picture line is thus skipped.

If none of the two outputs (+), (−) of the register R2 carried a signal, i.e. if the speed of the drum 2 was within the tolerance limits, the picture line counter RZ is not influenced. This counter is then controlled as usual by the trigger signals A via the gates 9 and 12.

What is claimed is:

1. A method for compensating synchronization errors in an actual transport speed of a rotating cylindrical record carrier in a non-impact matrix printer in which a line of print is formed by picture lines which are successively recorded on the record carrier in a horizontal direction parallel to the longitudinal axis of the record carrier, each picture line being recorded by a recording beam being deflected at a deflection frequency, a given spacing between a picture line having a first informational content and a successive picture line having a second informational content being predetermined, an actual spacing between a picture line and a successive picture line being dependent upon the deflection frequency of the recording beam and the actual transport speed of the record carrier, the method comprising the steps of:
deriving a control value from a difference between the actual transport speed and a predetermined transport speed of the record carrier;
recording a picture line having a first informational content;
deflecting the recording beam for a successive picture line having a second informational content, the deflection being in a vertical direction transverse of the longitudinal axis of the record carrier, the deflection being an amount dependent upon the control value;
comparing the amount to the given spacing, and
recording the successive picture line if the deflection amount is less than the given spacing, and delaying recording the successive picture line by a deflection period of the recording beam if the amount is equal to or greater than the given spacing.

2. A methd for compensating synchronization errors in the transport of a record carrier of a non-impact matrix printer in which stored information of a line of print is formed by picture lines which are successively recorded with a given spacing, an actual spacing of the picture lines being dependent upon an actual transport speed of the record carrier and a recording frequency of the picture lines, characterized in that the method comprises deriving a control value from a difference between the actual transport speed of the record carrier and a predetermined transport speed of the record carrier, the control value causing a shift of the recording of a picture line in a predetermined recording zone on the record carrier without changing the recording frequency of the picture lines, each picture line being recorded a number of times with a same informational content, the shifting of the recording of a picture line being performed only after recording the number of picture lines with the same content, which number is determined by the control value so that when the actual transport speed deviates from the predetermined transport speed in one direction, the picture line last recorded is recorded $(n+1)$ times, while when the actual transport speed deviates from the predetermined transport speed in another direction, the picture line to be recorded next is recorded $(n-1)$ times.

3. A circuit arrangement for compensating synchronization errors in an actual transport speed of a rotating cylindrical record carrier in a non-impact matrix printer in which a line of print is formed by picture lines which are successively recorded on the record carrier in a horizontal direction parallel to the longitudinal axis of the record carrier, each picture line being recorded by a recording beam being deflected in said horizontal direction at a deflection frequency, a preferred spacing between a picture line having a first informational content and a successive picture line having a second informational content being predetermined, an actual spacing between a picture line and a successive picture line being dependent upon said horizontal deflection frequency of the recording beam and the actual transport speed of the record carrier, the circuit arrangement comprising:

means for generating data based upon actual transport speed;
  means for producing picture line trigger pulses;
  a memory electrically connected to the producing means and storing said data based upon actual transport speed;
  a digital-to-analog converter electrically coupled to the memory and producing an output signal based upon said actual transport speed;
  a cathode ray tube having a coil for vertically deflecting the recording beam, and
  an amplifier electrically connected to the digital-to-analog converter output and driving the coil, the memory being switched to activate the coil responsive to negative pulse edges of the picture line trigger pulses, said coil deflecting the recording beam by a fraction of the picture line spacing.

4. A circuit arrangement as claimed in claim 3, wherein said means for generating data includes:
  means for deriving a first pulse series from the speed of revolution of the record carrier;
  a dual counter electrically connected to the deriving means and to the memory, the dual counter having an output at which a second pulse series is present responsive to the first pulse series, the second pulse series having pulses of a width which is larger than a pulse width of the picture line trigger pulses, and
  a phase comparator electrically connected to the output of the dual counter and to the producing means.

* * * * *